United States Patent [19]

Scuccato et al.

[11] Patent Number: 4,958,380
[45] Date of Patent: Sep. 18, 1990

[54] FAULT CURRENT LIMITER FOR DC MOTOR DRIVE SYSTEM

[75] Inventors: Serge L. Scuccato, Peterborough; Andrew C. Stevenson, Bailieboro, both of Canada

[73] Assignee: General Electric Canada Inc., Mississauga, Canada

[21] Appl. No.: 349,609

[22] Filed: May 10, 1989

[30] Foreign Application Priority Data

May 19, 1988 [CA] Canada ................................ 567250

[51] Int. Cl.⁵ ............................................. A02P 3/14
[52] U.S. Cl. ......................................... 388/806; 361/31
[58] Field of Search .................... 318/346, 132–133, 318/145, 431; 388/803–806, 815, 821–823, 826; 301/23, 30–31

[56] References Cited

U.S. PATENT DOCUMENTS

| | | | |
|---|---|---|---|
| 3,411,062 | 11/1968 | Kamens | 318/331 |
| 3,577,055 | 5/1971 | Hermansson | 318/376 X |
| 3,748,560 | 7/1973 | Sawa et al. | 318/376 X |
| 3,769,566 | 10/1973 | Mehta | 318/376 X |
| 3,826,962 | 7/1974 | Morton et al. | 318/376 |
| 4,095,152 | 6/1978 | Narita | 318/376 |
| 4,275,341 | 6/1981 | Huber et al. | 318/376 |
| 4,319,170 | 3/1982 | Brent | 318/376 |
| 4,323,833 | 4/1982 | Watanabe et al. | 318/376 |
| 4,401,926 | 8/1983 | Morton et al. | 318/376 |
| 4,471,277 | 9/1984 | Franz, Jr. | 318/376 |

FOREIGN PATENT DOCUMENTS

830070 12/1969 Canada .

*Primary Examiner*—William M. Shoop, Jr.
*Assistant Examiner*—David Martin
*Attorney, Agent, or Firm*—Edward H. Oldham

[57] ABSTRACT

There is disclosed a direct current motor drive system comprising a direct current motor operable in a forward motoring mode receiving current from a power source and in a reverse inversion mode providing inversion current to the power source. The drive system includes a converter for controlling motor operation. The converter converts alternating current, received from the power source, to direct current. The converter supplies direct current across terminals of the motor when operating in the forward motoring mode. The system includes an inversion fault current limiter for limiting inversion fault currents associated with motor operation in the reverse inversion mode without effecting the supply of current to the motor in the forward motoring mode. The inversion fault current limiter is electrically connected in series between the converter and one armature terminal of the motor. The inversion fault limiter includes a diode switch connected in parallel with a resistor. The diode switch conducts during the forward motoring mode to permit the flow of direct current therethrough from the converter to the motor. The diode switch does not conduct when the motor is operating in the reverse inversion mode so as to direct inversion current through the resistor and thereby limit the flow of inversion fault currents.

4 Claims, 1 Drawing Sheet

FAULT CURRENT LIMITER FOR DC MOTOR DRIVE SYSTEM

BACKGROUND OF THE INVENTION

The present invention relates to a circuit for limiting the regenerative fault currents developed during inversion operation of a drive system for a direct current motor.

It is common practice to operate direct current motors in a forward motoring mode of operation and a reverse inversion mode of operation. For example, in operating a mine hoist, motoring current is supplied to the motor to lift a payload up from the mine while the motor is operated in a reverse inversion mode to lower a payload into the mine.

During operation of the drive system in the inversion mode, the motor acts like a generator to put energy back into the power supply which is an AC line voltage connected through an AC to DC converter across the armature terminals of the motor. When operation in the inversion mode, the drive system is prone to regenerative currents or inversion fault currents which have been known to damage various components used in the drive system including the mechanical drive train. These inversion fault currents can be caused by a number of abnormal conditions such as, for example, a dip in the AC line voltage, a commutation failure in the converter driving the motor, or a short circuit condition associated with the motor.

In order to safeguard against inversion fault currents, transformers connected between the AC line and the power converter have been designed with a voltage margin above that of the operating voltage of the motor. This however adversely affects the power factor and increases the VAR demand from the AC line.

It is also known to discharge the inversion or regenerative currents by connecting a discharge resistor at all times across the output of the supply. However, this practice results in wasted power. Further, direct current contactors and interlock networks to connect the discharge resistor across the load when required have been used to protect the motor and circuitry. This solution has proven costly due to the cost of the high speed breaker used. In Canadian Pat. No. 830,070 issued Dec. 16, 1969 to Krajewski there is disclosed an energy dissipating circuit that connects a discharge resistor across the output of the supply when the regenerative current exceeds a predetermined amount. The resistor is switched into circuit by the use of a thyristor whose gate electrode senses a voltage rise above an acceptable level.

SUMMARY OF THE PRESENT INVENTION

It is an object of the present invention to provide a means for limiting the regenerative or inversion fault current in a direct current motor drive system without effecting the supply of motoring current to the motor.

It is another object of the present invention to provide a means for limiting the inversion fault current associated with a direct current motor drive system whereby the risk of damage to the components of the motor drive system from excessive regenerative currents is diminished.

It is another object of the present invention to provide a drive system that utilizes a transformer requiring a reduced safety margin and reduced power consumption.

In accordance with one aspect of the present invention there is provided a direct current motor drive system comprising a direct current motor operable in a forward motoring mode receiving current from a power source and in a reverse inversion mode providing inversion current to the power source. The drive system includes converter means for controlling motor operation. The converter means converts alternating current, received from the power source, to direct current and supplies direct current across terminals of the motor when operating in the forward motoring mode. The drive system comprises inversion fault current limiting means for limiting inversion fault currents associated with motor operation in the reverse inversion mode without effecting the supply of current to the motor in the forward motoring mode. The inversion fault current limiting means is electrically connected in series between the converter means and one armature terminal of the motor. The inversion fault limiting means includes diode switch means connected in parallel with resistance means. The diode switch means conducts during the forward motoring mode to permit the flow of direct current therethrough from the converter means to the motor. The diode switch means does not conduct when the motor is operating in the reverse inversion mode so as to direct inversion current through the resistance means and thereby limit the flow of inversion fault currents.

It should be understood that the value of the resistance means can be chosen so as to safely limit the flow of inversion fault current through the motor and other components of the drive system circuitry.

By using the limiting current resistor in the manner described, the use a high speed contactor across the armature is not needed. The resistor by limiting the inversion fault current enhances the longevity of the drive electrical circuitry and reduces the torque fault levels to within acceptable tolerances of the mechanical drive train. By reducing the inversion fault current levels, the drive system of the present invention effectively reduces the margin required to be built into the transformer connecting the converter with the AC power which reduces the power consumption of the drive system.

In one preferred embodiment that the converter means is bi-directional operable to control the supply of current to and from the motor respectively during the forward motoring mode and reverse inversion mode. In this embodiment the diode switch means includes a diode having its anode electrode connected to the converter means and its cathode electrode connected to the one terminal of the motor. The motor has a field winding associated with the motor and a uni-directional converter means connected to control the current to the field winding.

In another preferred embodiment the converter means is uni-directional operable to control the supply of current to the motor in the forward motoring mode. The drive system further includes a field winding associated with the motor and a bi-directional converter means connected to control the current to the field winding and control the mode of operation of the motor. The diode switch means comprises a thyristor connected between the converter means and one terminal of the motor. The thyristor has its gate terminal connected to gating logic which controls the conduction of the thyristor during switching of the motor between the forward motoring mode and the reverse inversion mode.

BRIEF DESCRIPTION OF THE DRAWING

For a better understanding of the nature and objects of the present invention, reference may be had by way of example to the accompanying diagrammatic drawing in which.

DETAILED DESCRIPTION OF THE PRESENT INVENTION

Figure 1:
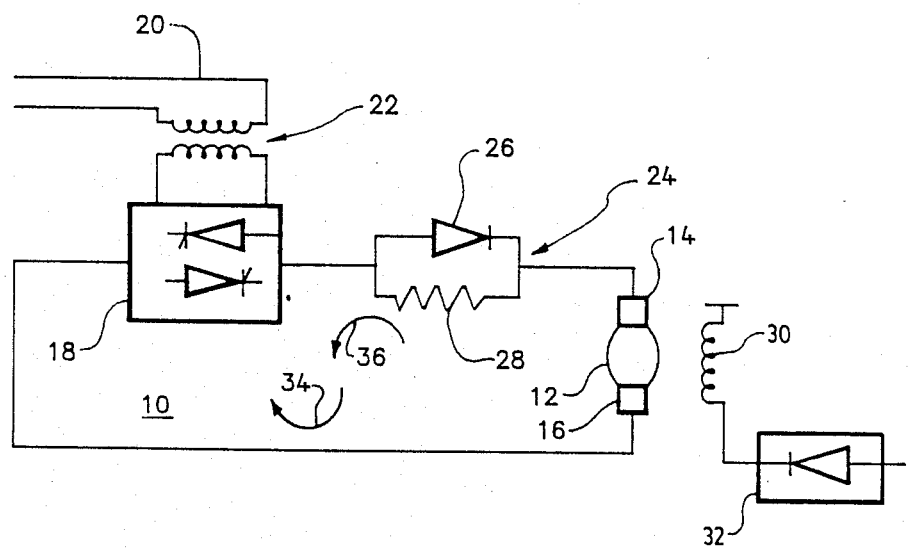
FIG. 1 is a schematic representation of a motor drive system incorporating the inversion fault current limiting means of the present invention where the drive system includes a bi-directional converter in circuit with the armature winding of the motor.

Referring to FIG. 1 there is shown one preferred drive system 10 for a direct current motor 12. Current is supplied to the motor 12 across its armature terminals 14 and 16.

Direct current is supplied to and taken from the motor terminals by a bi-directional converter 18. Converter 18 comprises any suitable thyristor controlled firing circuit that is capable of converting alternating current into direct current during the motoring mode of operation of the motor 12 and converts the direct current to alternating current during the inversion mode of operation of the motor and drive system. The converter 18 is connected to AC power lines 20 through transformer 22.

Connected in series electrical relation between the terminal 14 of motor 12 and the converter 18 is an inversion fault current limiting means 24. The fault current limiting means includes diode means 26 connected in parallel with resistance means 28. The diode means 26 has its anode electrode connected to the converter means 18 and its cathode electrode connected to the positive terminal 14 of the motor 12.

While motor speed and direction is controlled by the converter 18, the motor speed is also controlled by excitation of the motor field winding 30 through a uni-directional converter 32.

During motor operation in the forward motoring mode of operation, current, moving in the direction shown by arrow 34, is supplied to the motor 12 from the convertor 18. This current passes through diode 26 which conducts during forward motoring operation. Virtually no current passes through resistor 28 at this time. When the drive system is to operate in the reverse inversion mode of operation, current will flow in the direction indicated by arrow 36. Consequently, diode 26 is not conducting and current flows through limiting restistor 28. Resistor 28 is chosen so that its resistance value sufficiently limits the flow of regenerative or inversion fault currents therethrough and thus protects the motor and converter components of the drive system from sudden excessive fault currents.

Figure 2:
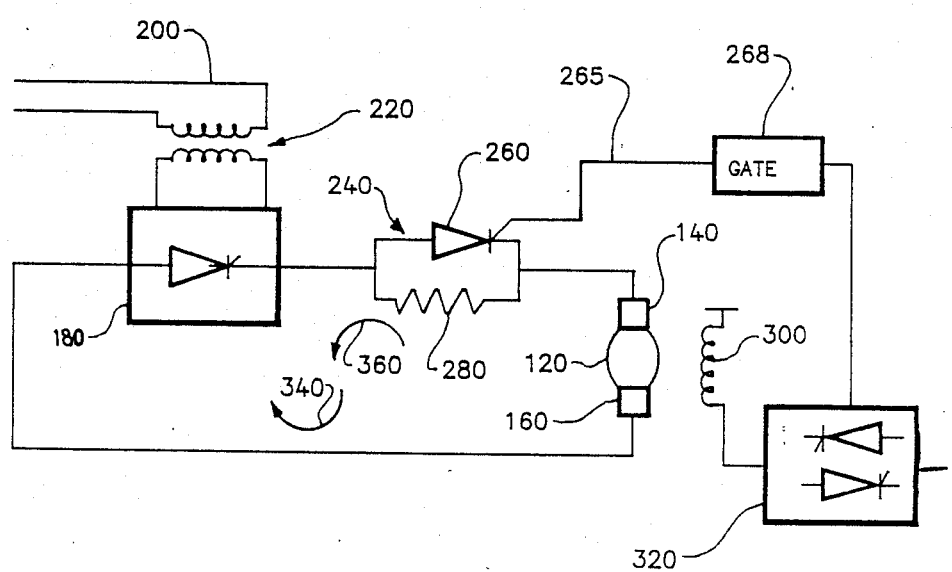
FIG. 2 is a schematic representation of a motor drive system incorporating the inversion fault current limiting means of the present invention where the drive system includes a uni-directional converter in circuit with the armature winding of the motor and a bi-directional converter in circuit with the field winding of the motor.

Referring to FIG. 2 there is shown another preferred drive system 100 for a direct current motor 120. Current is supplied to the motor 120 across its armature terminals 140 and 160.

Direct current is supplied to the motor terminals by a uni-directional converter 180. Converter 180 comprises any suitable thyristor controlled firing circuit that is capable of converting alternating current into direct current during the motoring mode of operation of the motor 12. The converter 180 is connected to AC power lines 200 through transformer 220.

Connected in series electrical relation between the terminal 140 of motor 120 and the converter 180 is an inversion fault current limiting means 240. The fault current limiting means includes thyristor or SCR 260 connected in parallel with resistance means 280. The thyristor 260 has its anode electrode connected to the converter means 180 and its cathode electrode connected to the positive terminal 140 of the motor 120. The thyristor 260 has a gate electrode 265 connected to gate logic circuitry 268. Motor speed and direction is controlled by the bi-directional converter 320 connected to the field winding 300 of the motor 120.

During motor operation in the forward motoring mode of operation, current, moving in the direction shown by arrow 340, is supplied to the motor 120 from the convertor 180. This current passes through conducting thyristor 260 since the gate electrode 265 will be enabled by the logic circuitry 268. Virtually no current passes through resistor 280 at this time. When the drive system is to operate in the reverse inversion mode of operation, current will flow in the direction indicated by arrow 360 due to a change in the direction of the field current supplied to the field winding 300 by converter 320. This change in direction of current is sensed by the logic circuitry 268 which inhibits the gate electrode 265 of thyristor 260 resulting in the thyristor not conducting. Consequently, diode 260 is not conducting and current flows through limiting restistor 280.

What we claim as new and desire to secure by Letters Patent of the United States of America is:

1. A direct current motor drive system comprising:

a direct current motor operable in a forward motoring mode receiving current from a power source and in a reverse inversion mode providing inversion current to the power source;

converter means for controlling motor operation, the converter means converting alternating current, received from the power source, to direct current and supplying direct current across terminals of the motor when operating in the forward motoring mode; and, inversion fault current limiting means for limiting inversion fault currents associated with motor operation in the reverse inversion mode without effecting the supply of current to the motor in the forward motoring mode, the inversion fault current limiting means being electrically connected in series between the converter means and one armature terminal of the motor, the inversion fault current limiting means including diode switch means connected in parallel with resistance means, the diode switch means conducting during the forward motoring mode to permit the flow of direct current therethrough from the converter means to the motor, and the diode switch means not conducting when the motor is operating in the reverse inversion mode so as to direct inversion current through the resistance means and thereby limit the flow of inversion fault currents.

2. The direct current drive system of claim 1 wherein the converter means is bi-directional operable to control the supply of current to and from the motor respectively during the forward motoring mode and reverse inversion mode, the diode switch means comprising a diode having its anode electrode connected to the converter means and its cathode electrode connected to the one terminal of the motor.

3. The direct current drive system of claim 2 including a field winding associated with the motor and a uni-directional converter means connected to control the current to the field winding.

4. The direct current drive system of claim 1 wherein the converter means is uni-directional operable to control the supply of current to the motor in the forward motoring mode, the drive system further including a field winding associated with the motor and a bi-directional converter means connected to control the current to the field winding and control the mode of operation of the motor, the diode switch means comprising a thyristor connected between the converter means and one terminal of the motor, the thyristor having its gate terminal connected to gating logic which controls the conduction of the thyristor during switching of the motor between the forward motoring mode and the reverse inversion mode.

* * * * *